Feb. 6, 1968　　　　G. BOCCIARDO　　　　3,367,650
CONVEYOR SYSTEM FOR STACKING HIDES, THEIR FLESH SIDES BEING
OPPOSITE TO EACH OTHER AND THEIR OUTER SIDES BEING OPPOSITE
TO EACH OTHER RESPECTIVELY, ON SUBSTANTIALLY
HORIZONTAL LOADING PLANE
Filed Dec. 6, 1965
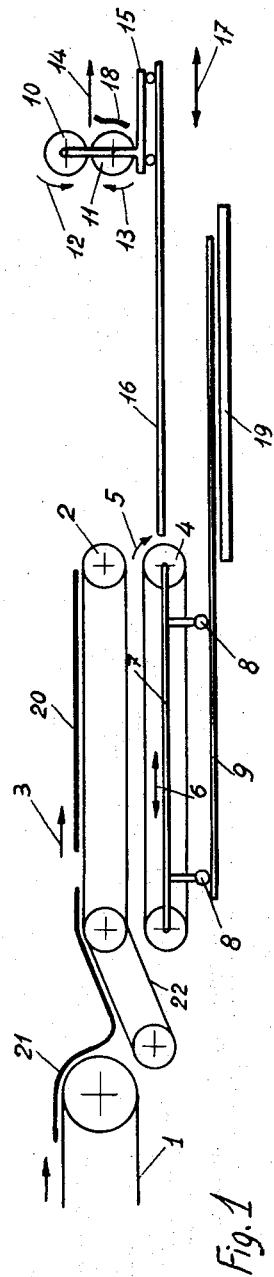
INVENTOR
GIACOMO BOCCIARDO

United States Patent Office 3,367,650
Patented Feb. 6, 1968

3,367,650
CONVEYOR SYSTEM FOR STACKING HIDES,
THEIR FLESH SIDES BEING OPPOSITE TO
EACH OTHER AND THEIR OUTER SIDES
BEING OPPOSITE TO EACH OTHER RESPEC-
TIVELY, ON SUBSTANTIALLY HORIZON-
TAL LOADING PLANE
Giacomo Bocciardo, Via Canevari 39, Genoa, Italy
Filed Dec. 6, 1965, Ser. No. 511,730
Claims priority, application Italy, Jan. 4, 1965,
509/65, Patent 748,598
7 Claims. (Cl. 271—68)

ABSTRACT OF THE DISCLOSURE

Conveyor system in which flexible sheets or hides are stacked automatically. The sheets or hides have different kinds of major side surfaces and are stacked with the alike surfaces in contact with another even though they are received in the system otherwise.

A principal object of the present invention is to provide a system of conveyors with closely co-ordinate movements, by means of which it is possible to receive, without any use of manual labor, hides or flexible sheets coming from a continuous conveyor and to place them on top of each other, that is to stack them on a horizontal plane.

The main characteristic of such a device is that the hides (or sheets) are placed on top of each other with the faces alternated, that is in the case of hides with the flesh sides opposite to each other and the outer sides opposite to each other respectively.

The stacking device for hides which are to be stacked on top of each other with the flesh sides opposite to each other as well as the outer sides respectively, or for any other flexible sheets the two surfaces of which have been differently treated and need the same kind of stacking as the mentioned hides, the sheets or hides being fed by a first conveyor with the flesh side and the outer side respectively being directed always in a same direction, is characterized in that it comprises, besides the first conveyor, a second belt conveyor exactly under the first one. The frame of the second conveyor moves out from under the first conveyor so as to receive the first one of each pair of hides discharged by the first conveyor, during this forward movement the transport speed of this second belt conveyor is zero while its translation speed is substantially equal to the transport speed of said first conveyor; means are provided to reverse the motion of the frame of the second conveyor and to control at the same time its transport movement in a direction opposite to the translation movement, when the first belt conveyor has completely discharged thereon the first hide in such a way that the hide is discharged by the second belt conveyor onto a suitable loading plane without substantially being subject to horizontal translation means bend downwardly each second hide which begins to be discharged from the first belt conveyor onto the second one as soon as the latter starts its rearward movement. This means is adapted to overturn the second one of each pair of hides coming from the first conveyor onto the preceding hide which the second belt conveyor is placing onto the loading plane.

The device for stacking hides is also characterized in that the loading planes of the first and second belt conveyors are arranged at different levels. The longitudinal axes of the two belt conveyors are on the same vertical plane. The second belt conveyor is movable on guides parallel to its transport movement and to that of the first belt conveyor between two end positions, such as when in the first position it is under the first belt conveyor, and when in the second position it projects from under the first conveyor a distance at least equal to the length of the hides to be stacked.

The device for stacking hides has the translation speed of the second belt conveyor, during its forward motion, substantially equal in value and direction to the transport speed of the first conveyor, while during its backward or return motion its translation speed is substantially equal to its transport speed, but in an opposite direction.

The device for stacking hides is further characterized in that it comprises a pair of drawing rolls tangent to each other and rotating in opposite directions, provided simultaneously with a reciprocating translation motion, parallel to the translation movement of the second conveyor and out of phase of at least half a period with respect to the latter. The pair of drawing rolls is movable between two end positions, the first of which is close to the discharge end of the first conveyor in position so as to be able to catch the end of the second one of each pair of hides coming out from the first conveyor. The pair of rotating olls is integral in its translation movement with deflection means constituted by a guide surface arranged rearwardly to the roller pair, inclined downwardly and accompanying the outline of the lower roller so that each hide caught and drawn by the rollers is bent downwardly and placed on the second belt conveyor on top of the hide previously placed thereto by the first conveyor, but in reverse position with respect to the previous hide, that is the flesh sides opposite to each other or the outer sides opposite to each other.

A feature of the device for stacking hides is that the translation speed by which the group of drawing rolls moves away from the discharge end of the first conveyor, after having caught the second one of each pair of hides coming from the first conveyor, is substantially equal in value and direction to the transport speed of the first conveyor and at the same time the rotation of the speed of the rolls is preferably such that the lower roll rolls without sliding on an ideal horizontal plane below and tangent thereto.

The device is further characterized in that the support plane on which the hides are stacked two by two is provided with a lowering motion suitable to keep constant the upper level of the stack of hides on top of which the hides are successively placed.

The device is finally characterized in that the whole constituted by the first and second conveyors and by the pair of drawing rolls may be lifted with respect to the increase of the thickness of the layer of hides placed by the second belt conveyor on the loading plane.

The objects, advantages and characteristics of the present invention will be further understood from the following description concerning embodiments, chosen by way of example only, with reference to the accompanying drawings in which:

FIG. 1 is a diagrammatic section view, along a longitudinal vertical plane, of a preferred embodiment of the invention with particular reference to the position assumed by the various elements of the device at the start of the first of the two steps constituting the operating cycle of the machine;

FIG. 2 is the same diagrammatic section view of FIG. 1, at the end of the first step and at the start of the second step of the operating cycle of the machine;

FIG. 3 is the same diagrammatic section of FIGS. 1 and 2, at the middle of the second step of the operating cycle of the machine.

With particular reference to FIG. 1 a discharge end 1 of an operating machine or conveyor feeding, with their flesh sides and outer sides always directed in the same direction, the hides which are to be stacked with their flesh sides opposite to each other and their outer sides opposite to each other, to the stacking device which comprises an upper or first conveyor 2. The first conveyor 2 comprises a stationary frame, provided with a continuous transport motion according to the direction of an arrow 3. A second or lower conveyor 4 is provided with an intermittent transport motion according to the direction of arrow 5, and a frame to which is applied a reciprocating motion according to the opposite directions illustrated by an arrow 6. The frame 7 of the second or lower conveyor 4 effects its translation movement by means of rollers or wheels 8 which run on guides 9. Two tangential rollers 10, 11 are provided with rotating motion according to the directions illustrated by arrows 12 and 13 and are suitable to draw according to the direction of arrows 14, the hides delivered to the rollers or rolls at their point of tangency. The two drawing rolls 10 and 11 are supported by a movable frame or carriage 15 provided with a reciprocating motion on guides 16 according to the directions illustrated by arrow 17. A deflecting element 18 makes the hides, which are drawn by rolls 10 and 11 according to the direction of arrows 14, bend downwardly as later described. A horizontal loading plane 19 is provided and on which are stacked the hides, with their flesh sides opposite to each other and their outer sides opposite to each other respectively. Two hides 20, 21 to be stacked, are illustrated arriving on the first conveyor. The horizontal loading plane 19 is provided, with respect to the device, with a lowering motion corresponding to the increase of the thickness of the layer of hides stacked thereon.

The device operates in a following way: the hide or sheet 20 arriving from the operating machine 1 passes onto the conveyor 2. When the forward edge of the hide 20 reaches the end of the conveyor 2 it actuates a pin or key, not shown in the drawings, which by means of an electric switch actuates a drive, not shown, for the translation movement of conveyor 4, keeping its transport speed nil. Therefore, conveyor 4 reaches a position 4′ with a translation speed substantially equal to the transport speed of conveyor 2 and hide 20 passes on to a position 20′ on the conveyor in its position 4′.

At this moment, by means of the translation of the carriage 15 carrying the rolls 10 and 11, the latter are carried to operating positions 10′ and 11′ and are thus close to the end of the conveyor 2.

When the entire hide 20 has passed onto the conveyor 4′ another switch is actuated which operates, apparatus not shown, for both the backward or return translation movement of the lower conveyor 4′ and its transport movement.

The speeds of the two movements are equal and opposed or in opposite directions, therefore the relative speed of the hide in its position 20″ with respect to the loading plane 19″ is nil and the hide is placed or discharged thereon.

At the beginning of the second step of the operating cycle, shown in FIG. 2, the hide 21′ is engaged by the pair of drawing rolls 10′ and 11′ rotating according to the directions illustrated by the arrows 12 and 13 and thus the carriage on which the rolls are mounted moves forward along guide rails 16. The second hide in its position 21″ when coming out of the rolls is reversed by means of element 18 downwardly and in a backwards direction. In such a way the hide 21′ is placed onto the underlying hide 20″ with their flesh sides opposite to each other or their outer sides opposite to each other respectively. At the end of the second step of the operating cycle both hides are on the loading plane 19 and both carriage 15 and conveyor 2 are again in their initial position as shown in FIG. 1. In this way the conveyor 2 is ready to receive a third hide and again start the cycle.

As shown in the drawing, the first conveyor 2 is provided with an element or portion 22 pivotable with respect to its forward end, which allows the arrangement of the loading planes of conveyor 2 and the operating machine 1.

Although for description reasons the present invention has been based on what above described, and shown by way of example only, many changes may be made in embodying the invention, for instance the group constituted by the pair of drawing rollers may be replaced by two pairs of rollers mixed two by two in horizontal sense by a belt conveyor ring-closed in order to increase the contact surface between the drawing means and the hide. Each of the changes however, having to be considered as based on the following claims.

What I claim is:

1. A device for stacking hides which are to be stacked with their flesh sides opposite to each other and their outer sides opposite to each other respectively, or for any other material provided in flexible sheets, the two surfaces of which have been treated differently, requiring the same kind of stacking as said hides; said hides or sheets being fed by a first conveyor with the outer sides and the flesh sides respectively always in the same sense, the improvement which comprises, besides said first belt conveyor, a second belt conveyor positioned exactly under the first belt conveyor and having a frame driven to cause said first belt conveyor to project from under the first conveyor so as to receive the first of each pair of hides discharged by said first conveyor, during this forward movement the transport speed of the second belt conveyor being substantially zero while its translation speed is substantially equal to the transport speed of the first conveyor; means for reversing the direction of travel of the frame of said second belt conveyor and effecting at the same time its transport movement in an opposite direction with respect to said translation movement, when the first conveyor has completely discharged thereon said first hide, so that this hide is discharged by said second belt conveyor too onto a suitable loading plane, without substantially being subject to horizontal translation; means for bending downwardly each second hide which begins to be discharged from the first belt conveyor onto the second belt conveyor as soon as the second belt conveyor starts its return movement; and means to overturn the second of each pair of hides delivered from said first conveyor onto the preceding hide which said second conveyor is placing onto said loading plane.

2. A device for stacking hides as claimed in claim 1, in which the loading planes of the first and second belt conveyors are positioned at different levels, the longitudinal axes of the said two conveyors being at the same time positioned on a same vertical plane; guides on which said second belt conveyor is movable parallel to its transport motion and to the one of the first belt conveyor, between two end positions so that when it is in a position corresponding to the first of them it is under the first conveyor, and when it is in a position corresponding to the second of them it projects from under the first belt conveyor for a distance at least equal to the length of the hides to be stacked.

3. A device for stacking hides as claimed in claim 2, in which the translation speed of the second belt conveyor during its forward movement is substantially equal in value and direction to the transport speed of the first conveyor, while during its return movement the translation speed of the second conveyor is substantially equal in value but of different direction with respect to its transport speed.

4. A device for stacking hides as claimed in claim 1, further comprising a pair of drawing rolls tangential to each other and rotating in opposite directions, provided contemporaneously with a reciprocating translation movement, parallel to that of the second belt conveyor and out-of-phase substantially of half a period with respect to the second belt conveyor, means movably mounting said rolls for movement relative to said first belt conveyor between two end positions, the first of which is close to the discharge end of the first belt conveyor in such a position as to be able to catch the end of the second of each pair of hides coming from the first conveyor, a deflecting element comprising a guide surface arranged behind the pair of rolls arranged to execute translation movement with said rolls and inclined downwards, said deflecting element matching in cross section the cross section of the outline of the lower roll so that each hide caught and drawn by the roll is bent downwards and placed on the second belt conveyor on top of the hide placed thereon directly by the first conveyor, but in overturned position with respect to said hide previously placed, whereby the hides are stacked with their outer sides opposite to each other or their flesh sides opposite to each other.

5. A device for stacking hides as claimed in claim 4, comprising means for removing the two drawing rolls from the discharge end of the first conveyor, with a speed substantially equal in value and direction to the transfer speed of said first belt conveyor, and means for rotating said two rolls at such a speed that the lower roll rolls without sliding on an ideal horizontal plane tangent to the lower generating line thereof.

6. A device as claimed in claim 4, comprising means for lifting the support plane on which the hides are stacked two by two, to keep constant the upper level of the stack on which the hides are placed.

7. A device as claimed in claim 4, comprising means for lifting the group constituted by the first and second belt conveyors and by said pair of rolls together with the increase in thickness of the layer of the hides placed on the said loading plane by the said second belt conveyor.

References Cited

UNITED STATES PATENTS

| | | | |
|---|---|---|---|
| 1,040,480 | 10/1912 | Wood | 271—65 |
| 3,047,288 | 7/1962 | Ramm | 271—65 X |

EDWARD A. SROKA, *Primary Examiner.*

ANDRES H. NIELSEN, *Examiner.*